United States Patent Office 3,662,024
Patented May 9, 1972

3,662,024
UNSATURATED POLYESTER RESIN FORMATION IN UNSATURATED ESTER MONOMER AS SOLVENT
Charles E. Greene, Marion, Va., assignor to The General Tire & Rubber Company
No Drawing. Filed Nov. 24, 1970, Ser. No. 92,538
Int. Cl. C08f 21/00
U.S. Cl. 260—863                                    12 Claims

ABSTRACT OF THE DISCLOSURE

Liquid compositions which are free of unreactive solvent and capable of being polymerized upon addition of free-radical polymerization catalysts (e.g., organic peroxide) into solid thermoset resins, are made by forming unsaturated polyesters having an average molecular weight of about 1,000 to 25,000 and an average of 6 to 110 double bond unsaturations, at least 50% of which are maleate unsaturations, by polymerization in the presence of a double metal cyanide complex catalyst of unsaturated dicarboxylic acid anhydrides and alkylene oxides in the presence of monomeric unsaturated esters that do not undergo appreciable copolymerization at temperatures of 100° C. or below, that are compatible with the unsaturated polyesters and that are capable of copolymerization with the polyesters. The monomeric unsaturated ester acts as a solvent for the polyester during its formation and in the liquid composition and serves to cross-link the polyester when the liquid composition is polymerized under the influence of the free-radical polymerization catalyst.

BACKGROUND OF THE INVENTION

It is known that unsaturated polyesters derived from fumaric acid or its anhydride can be cross-linked by copolymerization with an ethylenically unsaturated monomer such as styrene. The products of such copolymerization have been extensively used in forming laminated products employing glass fiber mats and the like. Ordinarily maleate or fumarate polyesters are prepared by polycondensation of polymeric polyols with maleic or fumaric acid or acid anhydride. This polycondensation reaction usually requires relatively high temperatures, with the result that the majority of the maleate unsaturations are isomerized to fumarate unsaturations.

In view of the elevated temperature requirements, preferably with non-reactive solvents like benzene, characteristic of prior art methods of preparing maleate-fumarate polyesters, and the maleate-to-fumarate isomerization consequent thereupon, invariably the unsaturation of the acid moieties in the product polyester are predominantly fumarate unsaturations. Thus, a method of preparing high molecular weight polyesters containing a predominance of maleate unsaturations which could be successfully cured was not known. Process of preparing polyester derivatives of maleic acid, at considerably lower temperatures than previous polycondensation methods called for, containing a predominance of maleate unsaturations in the acid moieties have been developed. These new processes employ maleic anhydride and other organic carboxylic acid anhydrides with alkylene oxides of 2–18 carbon atoms using a double metal complex cyanide catalyst (preferably treated with an organic treating agent). This process is disclosed in U.S. Pat. 3,538,043.

Produced by any method, high molecular weight maleate polyesters, if not preparatorily heat treated to isomerize the maleate unsaturations to fumarate unsaturations, do not copolymerize readily with styrene or its equivalent. For example, it has been found that a copolymer, containing equivalent quantities of styrene and high molecular weight maleate polyester, remain soft and cheesy after curing.

The established procedure for making unsaturated polyester compositions for use in forming fiber reinforced plastic structures is to polymerize an unsaturated acid or anhydride, particularly maleic anhydride, with a polyol, conveniently in the presence of an inert solvent where high molecular weights are desired. After the desired degree of polymerization is obtained, the solvent is removed, e.g., by distillation, and a cross-linking monomer, typically styrene, is added to the polyester to create the polyester composition to be used for fiber impregnation and molding operations. Such procedures have the disadvantage of requiring removal of the benzene or other inert solvent used in the polyester forming reaction mixture since such removal involves added cost and, if not complete, will lead to inferior resin products formed by copolymerization of the polyester.

OBJECTS

It is a principal object of this invention to provide a method for cross-linking high molecular weight maleate polyesters with a class of compounds that simultaneously act as a solvent for the reaction and provide for cross-linking of the polyester by copolymerization in the presence of free-radical catalysts, whereby (1) the need to preparatorily heat the polyester to effect maleate-to-fumarate isomerization is eliminated;
(2) copolymerization is effected easily and rapidly;
(3) the resultant copolymer cures to a hard and rigid product; and
(4) new and extensively useful products are obtained.

Other objects and the broad scope of applicability of the invention will become apparent from the detailed description hereinbelow. It should be understood that the description and specific examples which are provided are given by way of illustration only; and that various changes and modifications, which will become apparent to those skilled in the art from the description, are possible within the scope and spirit of the invention.

SUMMARY OF THE INVENTION

The objects of the invention have been made possible by the discovery that unsaturated polyesters capable of polymerization through use of free-radical catalysts may be formed in the presence of unsaturated monomeric esters with which they may copolymerize to form cross-linked solid resins without causing the monomeric esters to polymerize during the polyester formation by using double metal cyanide complex catalysts to promote the polyester forming reaction. The monomeric ester, hence, not only serves as a solvent for the polyester forming reagents and the resulting unsaturated polyester, but then also cross-links the polyester into a thermoset resin upon addition of a free-radical type polymerization catalyst.

Briefly stated, the invention produces polymerizable compositions that consist essentially of a mixture of:

(A) At least one unsaturated polyester having an average molecular weight of about 1,000 to 25,000 and an average of 6 to 110 double bond unsaturations per molecule in the main chain, at least 50% of said double bond unsaturations being maleate unsaturations; and (B) At least one liquid unsaturated monomeric ester in which said polyester is soluble, said monomeric ester being selected from the group consisting of triallyl cyanurate, triallyl isocyanurate, vinyl acetate, and aromatic esters having the general formula:

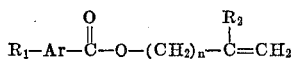

wherein

Ar is an aryl, aralkyl or alkaryl group containing 6 to 12 carbon atoms, $R_1$ is hydrogen or

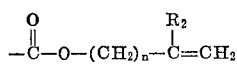

$R_2$ is hydrogen or methyl, and $n=0$ or 1, said monomeric ester being characterized by being incapable of appreciable copolymerization with maleic anhydride at temperatures below 100° C. in the absence of a free radical catalyst.

Such compositions are produced in accordance with the invention using a combination of steps that comprises:

(1) Providing a liquid mixture comprising maleic anhydride and an alkylene oxide containing 2 to 18 carbon atoms dissolved in a liquid unsaturated monomeric ester as hereinbefore defined, said mixture being free of volatile unpolymerizable organic solvent, (2) Providing in said liquid mixture a double metal cyanide complex catalyst, (3) Reacting the maleic anhydride with said alkylene oxide at a temperature between about 10 to 100° C. in the presence of said catalyst to form a polyester as hereinbefore defined dissolved in said monomeric ester, and (4) Recovering the resulting liquid polymerizable composition free of unreactive solvent.

DESCRIPTION OF PREFERRED EMBODIMENTS

The following details of operations in accordance with the invention and reported data illustrate the further principles and practice of the invention to those skilled in the art. In these examples and throughout the remaining specification and claims, all parts and percentages are by weight unless otherwise specified.

Example 1

The following materials were charged, in the parts indicated, into a single opening glass reaction vessel:

| | Parts |
|---|---|
| Vinyl benzoate | 1560 |
| Maleic anhydride | 980 |
| Propylene oxide | 580 |
| Catalyst: $Zn_3[Co(CN)_6]_2 \cdot Glyme$ | 3 |

The zinc hexacyanocobaltate complex catalyst, (hereinafter designated ZHC catalyst), was prepared as described in U.S. Pat. 3,278,459.

The reaction vessel, with its opening closed and pressure sealed, was immersed in a bath of heat exchange liquid maintained at a temperature of 50° C. As the vessel was slowly rotated upon rollers in the bath, the contents were allowed to react for 48 hours. Then, the vessel was removed from the bath and the contents were poured therefrom into a storage container. The reaction product was a slightly viscous liquid containing unsaturated polyester dissolved in vinyl benzoate. The polyester had an inherent viscosity of 0.1 dl./g. and an acid number 0.8. It readily polymerized on addition of 0.1% benzoyl peroxide into a hard resin.

In another case, the same charge of ingredients were reacted in similar manner for 18 hours at 80° C. The reaction product was a viscous amber liquid. The inherent viscosity of the polyester was 0.1 dl./g. and the acid number 30. S.P.I. gel time was 10 seconds and peak exotherm temperature was over 500° F. in 20 seconds. This polymerization composition was used to form a molded sheet by mixing 47 parts with 23 parts of clay and 1.2 parts of benzoyl peroxide. This blend was then used to impregnate a glass fiber mat weighing 30 parts. A flat fiber-reinforced plastic sheet having good flexural strength and flexural modulus was obtained by curing the impregnated mat in a flat mold at 125° C.

Example 2

The following materials were formed into a liquid polymerization composition using the equipment and procedure of Example 1:

| | Parts |
|---|---|
| Vinyl benzoate | 111 |
| Phenyl vinyl ether | 30 |
| Maleic anhydride | 245 |
| Propylene oxide | 145 |
| ZHC catalyst | 0.5 |

The polyester was formed by reaction of these ingredients for 18 hours at 50° C. The resulting product was a viscous, dark brown liquid. It had a S.P.I. gel time of 3.8 minutes and a peak exotherm temperature of 365° F. in 6.1 minutes.

Example 3

The following materials were reacted at 50° C. for 18 hours with the equipment and procedure described in Example 1:

| | Parts |
|---|---|
| Vinyl benzoate | 540 |
| Phthalic anhydride | 440 |
| Maleic anhydride | 440 |
| Propylene oxide | 510 |
| ZHC catalyst | 3 |

The resulting polymerizable composition was a viscous amber liquid with acid No. 16.5 and inherent viscosity 0.065 dl./g. The S.P.I. gel time was 0.918 minute and peak exotherm temperature was 424° F. in 1.73 minutes.

Example 4

This example concerns a stepwise preparation of polyester containing unsaturated monomer solution.

The following ingredients were charged into the reaction vessel of Example 1:

| | Parts |
|---|---|
| Vinyl benzoate | 1480 |
| Phthalic anhydride | 1850 |
| Propylene oxide | 725 |
| ZHC catalyst | 10 |

After being heated to 80° C. for 6 hours, all of the phthalic anhydride had dissolved producing a clear, slightly viscous solution. This was then heated in the reaction vessel for 48 hours at 50° C. Next, the vessel was removed from the heating bath and 1220 parts maleic anhydride and 800 parts of propylene oxide were charged into it. The vessel was then resealed and returned to the heating bath for 18 hours more reaction at 50° C. The product was an amber viscous liquid. The S.P.I. gel time was 1.38 minutes and the peak exotherm temperature was 400° F. in 1.89 minutes. By addition of 1.5% benzoyl peroxide, the product was cast into a solid resin by curing 1 hour at 70° C. and 1 hour at 120° C. The casting when exposed for about 330 hours in a "Weather-O-Meter" became less discolored than a casting made from a preformed 2000 M.W. propylene maleate phthalate polyester mixed with styrene having the same weight ratio of styrene to polyester as the weight ratio of vinyl benzoate to polyester in the product of this example.

In the foregoing examples, the data concerning S.P.I. gel times and peak exotherm temperatures were obtained by the following procedure:

50 grams of a syrup of the polyester containing reaction product plus ½ gram of benzoyl peroxides are poured into a special test tube to a predetermined depth. A thermocouple probe is inserted into the center of the material in the tube. The whole assembly is placed in a constant temperature bath (R80° C.). The gel time is the time for the temperature of the mixture to go from 150 to 190°

F. The peak exotherm temperature is the maximum temperature attained during cure. The peak time is the time from 150° F. to the time at which the peak temperature is attained.

DISCUSSION OF DETAILS

As indicated earlier, the polyesters utilized in the practice of this invention contain at least 50% of the main chain ethylenic unsaturation as maleate unsaturation. The remaining double bonds in the main chain may represent fumarate unsaturations or they may be double bonds from other acid or acid anhydride moieties. Preferably about 25–80 mol percent of the acid moieties in the polyester should have ethylenic linkages. With over 80 mol percent unsaturated acid moieties, the heat of curing or cross-linking with the vinyl ester may cause undesirable charring, bubbling, and/or cracking. If the polyester contains less than 25 mol percent unsaturated acid moieties, the product copolymer may not cure satisfactorily. It is possible, as an alternative to use a polyester having over 80 mol percent unsaturation in the acid moieties by dilution with atomite or a similar diluent. The remaining saturated acid moieties can come from saturated acid anhydrides such, for example, as phthalic or succinic anhydride. The remaining moieties in the polyester to bring the molecular weight to the desired level, come from the alkylene oxides, saturated or unsaturated, of from about 2 to 18 carbon atoms.

Up to 10 mol percent, based on 100 mols total of maleic anhydride and epoxide, of glycols, triols, tetrols, etc., dicarboxylic acids and tricarboxylic acids, etc., may be used during ester polymerization to control the molecular weight and/or viscosity of the polyester. Examples of such materials are propylene glycol, ethylene glycol, 1,4-butanediol, diethylene glycol, 1,2,6-hexane triol, dipropylene glycol, pentaerythritol, adipic acid, succinic acid, 8-hydroxy 1,2-naphthalene dicarboxylic acid, 4-chloroadipic acid, fumaric acid, maleic acid, pimelic acid, suberic acid, azelaic acid, malonic acid, glutaric acid and the like.

The molecular weight of the requisite polyester may vary from about 1,000 to 25,000 and the average polyester molecule should contain from about 6 to 110 ethylenic unsaturations per molecule, in the main claim. A combination of these two variables, the molecular weight and the number of ethylenic unsaturations per molecule in the main chain, within the ranges just stated, is partly determinative of the rigidity of flexibility of the cured product copolymer. It has been found, for example, that with vinyl benzoate as the cross-linker, when a polyester containing 6 main chain double bonds per molecule and having a molecular weight of 1,000 is used, the cured product will be rigid. The same is true of a polyester containing 100 main chain double bonds per molecule and having a molecular weight of 20,000, whereas, a flexible product is obtained if the polyester used contains 6 main chain double bonds and has a molecular weight of 20,000.

The rigidity or flexibility of the final product may also vary with the nature and concentration of the other groupings contained in the polyester chain. The cross-linker used is another factor which may have a bearing in this respect. Thus, in the last example just mentioned, e.g., using a polyester having 6 main chain double bonds per molecule and a molecular weight of 20,000, if the cross-linker employed were vinyl p-hexyl benzoate, the end product would be more flexible than the one cross-linked with vinyl benzoate.

The cross-linker, should be compatible with the maleate polyester utilized.

Vinyl benzoate is a preferred monomeric ester for use in preparing the polymerizable compositions of the invention. Other monomeric esters that may be advantageously used as the cross-linker/solvent include triallyl cyanurate, triallyl isocyanurate, 4-methyl vinyl benzoate, 2,4-dimethyl vinyl benzoate, 2-vinyl naphthoate, 5-vinyl naphthoate, vinyl acetate, diallyl phthalate, diallyl isophthalate, and equivalent monomeric esters.

As an essential component in the formation of the polyester that is dissolved in a monomeric ester as aforesaid, ethylene oxide and 1,2-propylene oxide are preferred. However, other alkylene oxides containing 2 to 18 carbon atoms may be used, including 1,2-butene oxide, 1,2-hexene oxide, 1,2-dodecane monoxide, isobutylene oxide, 1,2-pentene oxide, 1,2-isopentene oxide, 1,2-heptene oxide, 1,2-isoheptene oxide, 1,2-octene oxide, butadiene monoxide, isoprene monoxide, oxetane, 3,3-dimethyl oxetane, 3-allyl-3-methyl oxetane, 3-vinyl-3-methyl oxetane, 1,2-pentadecene oxide and 3-butyl-3-decene oxetane. It is advantageous to employ the lower molecular weight oxides containing 2 to 6 carbon atoms.

Maleic anhydride constitutes an essential component for the preparation of the polyester. This may be used alone or in combination with one or more other saturated polycarboxylic acid anhydride. As previously indicated, such additional carboxylic reagent may advantageously be phthalic or succinic anhydride. Other usable reagents, thus, include 3,4-dichlorophthalic anhydride, tetrahydrophthalic anhydride, polyazelaic acid, chlorendic anhydride, 2,3-dimethyl maleic anhydride, 4,5-dimethyl phthalic anhydride, 2-phenylethyl maleic anhydride and 2-tolyl maleic anhydride.

The double metal cyanide complex catalysts used in the methods of the invention are a recognized class of catalysts. They may be prepared by reacting a transition metal cyanide complex with a metal salt. The catalyst activity is preferably enhanced by treating the double metal cyanide with a complexing or coordinating material, such as an alcohol, ether, ester, sulfide, ketone or aldehyde. The preparation of such catalysts is described in detail in U.S. Pats. 3,278,457–9 and their use in formation of polyesters is described in U.S. Pat. 3,538,043. The disclosures of these patents is incorporated herein by reference for the purpose of disclosure of the present invention. Zinc hexacyano-cobaltate complexes are preferred catalysts, but examples of others, especially useful in the present invention, include zinc hexacyanoferrate (III), zinc hexacyanoferrate (II), nickel (II), hexacyanoferrate (II), and zinc hexacyanochromate (III). Mixtures of the double metal cyanide complex catalysts may be used.

The amount of catalyst employed can vary but is preferably used in the range of 0.005 to 5% by weight of the combined weight of alkylene oxide and anhydride reagent employed in forming the polyester. Advantageously, the amount of catalyst will be about 0.01 to 1.0% by weight of combined weight of alkylene oxide and anhydride reagents.

In preparing the maleate polyester-vinyl ester copolymer blend, for every one mol-equivalent unsaturation of polyester, 1 to 4 mols of vinyl ester are advantageously used. Less than one mol of a vinyl ester results in a poor quality copolymer product, and the heat distortion values of the copolymer suffer when more than four mols of vinyl ester are employed.

Generally, the free-radical polymerization catalysts utilized in polymerizing the new compositions of the invention are peroxides such as as benzoyl peroxide, dicumyl peroxide or hydroperoxides, e.g., tertiary butyl hydroperoxide or similar materials known to be useful as free-radical polymerization catalysts. Other functional additives may include fillers, such as silica, $TiO_2$, magnesium oxide, calcium oxide, carbon black, sawdust, ground phenolic resin scrap, ground hard rubber, resins, anti-degradants, stabilizers, pigments, etc.

The polymerizable compositions of the invention are particularly useful in making glass fiber laminates using woven or non-woven glass fiber mat sheets, chopped glass or glass fibers, fiber bolts, and with a glass-to-polyester weight ratio varying from 5:95 to 40:60. To improve the adhesion of the fibers to the polyester, the fibers may preparatorily be coated with sizing or other coating materials such as silanes, a practice well-known in the art. In this connection, the field of the applicability of the invention would include making automobile parts such as fenders, hoods, door panels, dash panels, and side trim; boats; helmets; chairs; building panels; food trays, etc.

Curing times for molded products, including glass fiber reinforced sheets, tubes and other shapes, will vary with the catalysts, ratio of glass fibers to polymerization composition, ratio of polyester to monomeric ester in the composition, amount and type of inhibitor that may be used in the composition. Typical curing conditions depending on size of molding and equipment are 30 seconds to 24 hours at 75° to 330° F.

Also contemplated for utility of the invention is the making of films, coatings, paints, and varnishes, where radiant heat may be used to cure the product. Numerous other applications, which become apparent to those skilled in the art from the foregoing description are also possible without departing from the scope and spirit of the invention.

The embodiments of the invention in which an exclusive property or privilege is claimed are defined as follows:

1. In the method of manufacture of a polymerizable composition free of unreactive solvent and capable of polymerizing upon addition of a free-radical polymerization catalyst into a solid thermoset resin, said composition consisting essentially of a mixture of:
 (A) at least one unsaturated polyester having an average molecular weight of about 1,000 to 25,000 and an average of 6 to 110 double bond unsaturations per molecule in the main chain, at least 50% of said double bond unsaturations being maleate unsaturations, and
 (B) at least one liquid unsaturated monomeric ester in which said polyester is soluble, said monomeric ester being selected from the group consisting of triallyl cyanurate, triallyl isocyanurate, vinyl acetate, and aromatic esters having the general formula:

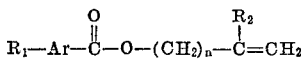

wherein
 Ar is an aryl, aralkyl or alkaryl group containing 6 to 12 carbon atoms,
 $R_1$ is hydrogen or

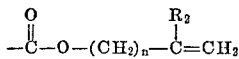

$R_2$ is hydrogen or methyl, and $n=0$ or 1,
said monomeric ester being characterized by being incapable of appreciable copolymerization with maleic anhydride at temperatures below 100° C. in the absence of a free radical catalyst,
a combination of steps that comprise:
 (1) providing a liquid mixture comprising maleic anhydride and an alkylene oxide containing 2 to 18 carbon atoms dissolved in a liquid unsaturated monomeric ester as hereinbefore defined, said mixture being free of volatile unpolymerizable organic solvent,
 (2) providing in said liquid mixture a double metal cyanide complex catalyst,
 (3) reacting the maleic anhydride with said alkylene oxide at a temperature from about 10 to 100° C. in the presence of said catalyst to form a polyester as hereinbefore defined dissolved in said monomeric ester, and
 (4) recovering the resulting liquid polymerizable composition free of unreactive solvent.

2. The method of claim 1 wherein said liquid mixture (1) contains additionally up to 10 mol percent of polyol or polycarboxylic acid.

3. The method of claim 2 wherein said liquid mixture (1) consists essentially of maleic anhydride, phthalic anhydride and propylene oxide dissolved in vinyl benzoate.

4. The method of claim 1 wherein said monomeric ester is selected from the group consisting of vinyl acetate, vinyl benzoate, diallyl phthalate, diallyl isophthalate, triallyl cyanurate and triallyl isocyanurate.

5. The method of claim 1 wherein said free-radical polymerization catalyst is an organic peroxide or hydroperoxide.

6. The method of claim 1 wherein said double metal cyanide complex catalyst is a zinc hexacyanocobaltate complex.

7. The method of claim 1 wherein said alkylene oxide is selected from the group consisting of ethylene oxide, propylene oxide, butylene oxide, isobutylene oxide and mixtures thereof.

8. The method of claim 1 wherein said liquid mixture contains additionally a dicarboxylic acid which is incorporated in the liquid mixture separately from the maleic anhydride.

9. The method of claim 8 wherein the maleic anhydride is incorporated in the liquid mixture after said dicarboxylic acid or anhydride has been mixed with said alkylene oxide and at least partially reacted therewith in the presence of said catalyst.

10. A liquid polymerizable composition made by the process of claim 1.

11. The method of claim 1 wherein said liquid mixture (1) contains additionally a carboxylic anhydride other than maleic anhydride.

12. The method of claim 11 wherein said dicarboxylic anhydride is incorporated in the liquid mixture separately from the maleic anhydride.

References Cited

UNITED STATES PATENTS 3,538,043  11/1970  Herold.

OTHER REFERENCES

Fischer, J., Polymer Sci. 44, 155–72 (1960).

Waddill et al., Ind. Eng. Chem. Prod. Res. 3, 53–55 (1964).

MELVIN GOLDSTEIN, Primary Examiner

U.S. Cl. X.R.

117—72, 126 GR; 161—195; 260—40 R, 868; 210—872

GT-613

PO-1050
(5/69)

UNITED STATES PATENT OFFICE
CERTIFICATE OF CORRECTION

Patent No. 3,662,024          Dated    May 9, 1972

Inventor(s) Charles E. Greene

It is certified that error appears in the above-identified patent and that said Letters Patent are hereby corrected as shown below:

Column 1, line 59, which reads "Process" should read --Processes--.

Column 4, line 70, which reads "peroxides" should read --peroxide--.

Column 4, line 74, which reads "(R80°C.)" should read --(80°C.)--.

Column 8, line 44, which reads "dicarboxylic" should read --carboxylic--.

Signed and sealed this 21st day of November 1972.

(SEAL)
Attest:

EDWARD M. FLETCHER, JR.
Attesting Officer

ROBERT GOTTSCHALK
Commissioner of Patents